(12) United States Patent
Moore et al.

(10) Patent No.: US 8,619,948 B2
(45) Date of Patent: Dec. 31, 2013

(54) INTELLIGENT INTERACTIVE AUTOMATED NOTIFICATION SYSTEM

(75) Inventors: Joe Harley Moore, Swansea, IL (US);
John William Lindemann, III, St. Louis, MO (US); Scott Allen Schulte, Creve Coeur, MO (US)

(73) Assignee: Groupcast, LLC, St. Louis, MO (US)

( * ) Notice: Subject to any disclaimer, the term of this patent is extended or adjusted under 35 U.S.C. 154(b) by 669 days.

(21) Appl. No.: 12/768,343

(22) Filed: Apr. 27, 2010

(65) Prior Publication Data
US 2011/0261933 A1    Oct. 27, 2011

(51) Int. Cl.
*H04M 1/64*    (2006.01)

(52) U.S. Cl.
USPC .................................. 379/88.12; 379/88.16

(58) Field of Classification Search
USPC .......................... 379/88.12; 704/270; 434/350
See application file for complete search history.

(56) References Cited

U.S. PATENT DOCUMENTS

| | | | |
|---|---|---|---|
| 6,208,970 B1* | 3/2001 | Ramanan ...................... | 704/270 |
| 7,684,548 B1* | 3/2010 | Rodkey et al. ............. | 379/88.12 |
| 8,180,274 B2* | 5/2012 | Bender ......................... | 434/350 |
| 2007/0292835 A1* | 12/2007 | Hartman et al. .............. | 434/350 |

OTHER PUBLICATIONS

SchoolReach(R) Instant Parent Contact, EZ Attendance Plus(TM) and EZ Lunch Balance Plus(TM) Notifications, www.schoolreach.com, 2009, 1 page.
SchoolReach(R) Instant Parent Contact, EZ Data Sync(TM), Documentation, www.schoolreach.com, 2009, 29 pages.
SchoolReach(R) Instant Parent Contact, EZ Data Sync(TM), Quick Start, www.schoolreach.com, 2009, 22 pages.
SchoolReach(R) Instant Parent Contact, EZ Data Sync.(TM)—White Paper, www.schoolreach.com, 2009, 1 page.
SchoolReach(R) Instant Parent Contact, EZ DataSync(TM), Simple and automated transfer of student data, www.schoolreach.com, 2009, 1 page.

* cited by examiner

*Primary Examiner* — Mohammad Islam
*Assistant Examiner* — Van D Huynh
(74) *Attorney, Agent, or Firm* — Thompson Coburn LLP

(57) ABSTRACT

A method and system are disclosed for intelligently notifying first parties via automated telephone calls regarding an absence by second parties at an event with minimal burden on a third party who manages attendance issues for the event. In a preferred embodiment, the event is a school session, the second parties are students who are supposed to attend the school session, the first parties are guardians for the students, and the third party is a school employee who handles attendance issues. Differentiated notifications are provided to first parties based on whether the first parties receive the notifications in person or in absentia. The first parties are also provided with opportunities for responding to the notifications while avoiding direct interactions with the third party.

37 Claims, 6 Drawing Sheets

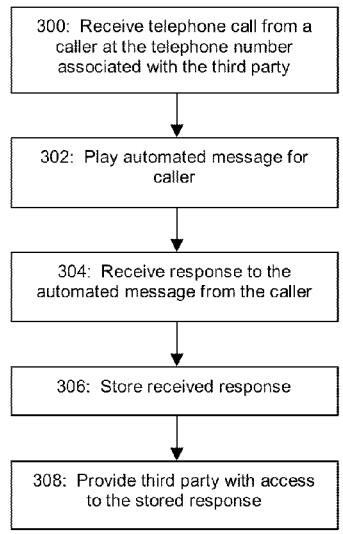

Figure 3

| School District ID | School ID | Student Name | Absence ID | Guardian Name(s) | Guardian Contact Info |
|---|---|---|---|---|---|
| Washington | Washington East High School | Johnny Smith | Day | Alice and Bob Smith | 555-555-5555 |
| Washington | Washington East High School | Jane Doe | Third Period | Charlie and Diane Doe | 555-555-1234 |
| ⋮ | ⋮ | ⋮ | | ⋮ | |
| Washington | Washington South Middle School | Timmy Jones | Day | Emily Jones | 555-555-4321 |
| | ⋮ | | | ⋮ | |
| Washington | Washington West Elementary | Sally Smith | Day | Alice and Bob Smith | 555-555-5555 |

Figure 4(a)

INTELLIGENT INTERACTIVE AUTOMATED NOTIFICATION SYSTEM

BACKGROUND AND SUMMARY OF THE DISCLOSURE

Most schools maintain attendance records to track whether students attend school. It is known in the art to process these attendance records to generate automated alerts that are broadcast to the guardians for absent students. However, to the inventors' knowledge, such systems often result in the school district's telephone lines being inundated with responsive telephone calls from guardians shortly after the alerts are broadcast. Typically, such inundation occurs shortly after the broadcasts regarding student absences are sent out and continues for an hour or more thereafter. During this time, school personnel are bombarded with telephone calls from guardians to explain why their respective children were absent, which pulls those personnel away from their other work tasks. Given the consistent and intermittent patterns of these calls from guardians, school personnel are rendered highly unproductive during this time. Furthermore, given some people's talkative natures, it is not uncommon for these telephone calls from guardians regarding their child's absence to branch out into other topics which further hinders the productivity of the school personnel.

In an effort to provide a solution to these problems, the inventors disclose methods and systems for intelligently notifying first parties via automated telephone calls regarding an absence by second parties at an event with minimal burden on a third party who manages attendance issues for the event. Preferably, the event is a school session, the second parties are students who are supposed to attend the school session, the first parties are guardians for the students, and the third party is a school employee who handles attendance issues.

In accordance with a first exemplary embodiment, the inventors disclose a method comprising: (1) initiating a communication session with a communications device associated with a first party via an automated telephone call, (2) detecting whether the communication session is an in person communication with a user of the communications device or an in absentia communication session with the communications device, (3) in response to detecting that the communication session is an in person communication session, (a) sending a first automated notification to the user via the automated telephone call, the first automated notification configured to provide a notification regarding a non-attendance by a second party at an event, wherein the first automated notification is further configured to be interactive to permit the user to respond to the notification, (b) receiving the user's response to the first automated notification during the automated telephone call, (c) storing the received response, and (d) providing a third party with access to the stored response, and (4) in response to detecting that the communication session is an in absentia communication session, sending a second automated notification to a messaging service associated with the communications device via the automated telephone call, the second automated notification configured to provide a notification regarding the non-attendance by the second party at the event and also including contact information associated with a third party, and wherein the initiating, detecting, first automated notification sending, receiving, storing, providing and second automated notification sending steps are performed by a processor.

In accordance with a second exemplary embodiment, the inventors disclose a system comprising a processor configured to (1) initiate a communication session with a communications device associated with the first party via an automated telephone call, (2) detect whether the communication session is an in person communication with a user of the communications device or an in absentia communication session with the communications device, (3) in response to detecting that the communication session is an in person communication session, (a) send a first automated notification to the user via the automated telephone call, the first automated notification configured to provide a notification regarding a non-attendance by a second party at an event, wherein the first automated notification is further configured to be interactive to permit the user to respond to the notification, (b) receive the user's response to the first automated notification during the automated telephone call, (c) store the received response, and (d) provide a third party with access to the stored response, and (4) in response to detecting that the communication session is an in absentia communication session, send a second automated notification to a messaging service associated with the communications device via the automated telephone call, the second automated notification configured to provide a notification regarding the non-attendance by the second party at the event and also including contact information associated with a third party.

Through such exemplary methods and systems, the burdens placed on third parties can be greatly decreased because the methods and systems guide first parties into responding to the notifications without directly interacting with the third party. In doing so, third parties are freed to perform other tasks and be more productive.

These and other features and advantages of the present invention will be apparent to those having ordinary skill in the art upon a review of the disclosure herein.

BRIEF DESCRIPTION OF THE DRAWINGS

FIG. 3 depicts another flowchart showing an exemplary process flow for an automated notification system;

DETAILED DESCRIPTION OF THE PREFERRED EMBODIMENTS

Figure 1:
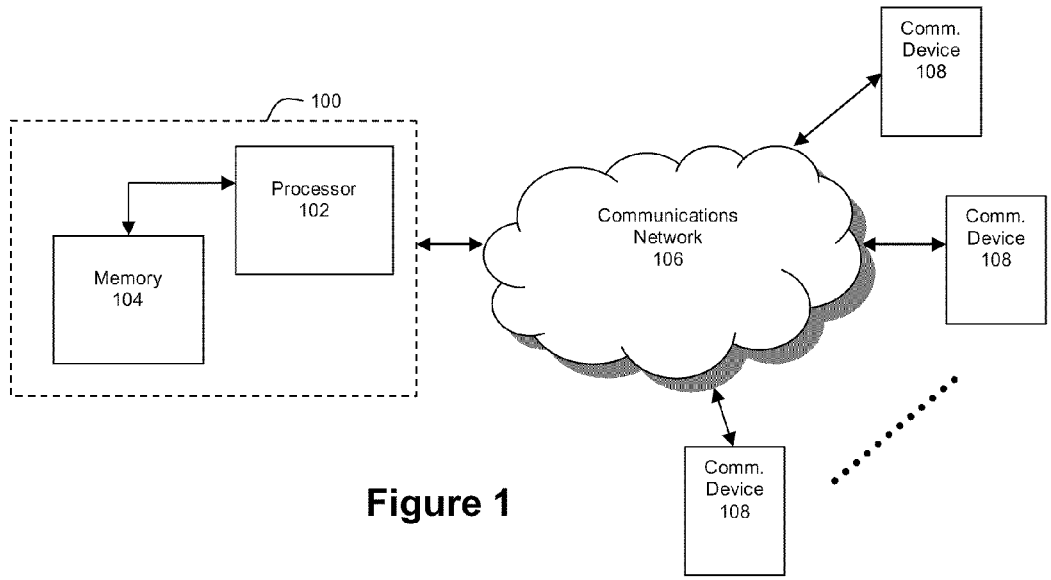
FIG. 1 depicts an exemplary system diagram illustrating how an automated notification system can communicate with various communication devices.

FIG. 1 illustrates an exemplary system architecture for an automated notification system. The automated notification system 100 comprises a processor 102 in communication with a memory 104. The processor 102 can be any processor with sufficient computational power for carrying out the processes described herein. For example, the processors within standard off-the-shelf servers are suitable. It should also be understood that the processor 102 can comprise a plurality of processors, such as distributed processors on separate servers, different processing cores on a multi-processor, etc. The memory 104 can be any device for storing data, such as the hard drive of a computer, whether the data be stored as files in a file system, as records in a database, or the like (or some combination thereof). It should also be understood that the memory 104 can, if desired, be distributed across a plurality of memory devices. In an exemplary embodiment described below (see FIG. 7), the automated notification system can comprise one or more broadcast servers 702 and one or more incoming call processing servers 704, each with its own processing and memory resources.

The processor 102 is preferably configured for communicating with a plurality of communication devices 108 via a connection through system 100 to a communications network 106. The communications network may comprise any data communication network, such as the Internet, the Public Switched Telephone Network (PSTN), or a combination thereof. The communication devices 108 can be devices such as landline telephones, mobile telephones (smart phones, cell phones, etc.), computers (laptops, desktops, etc.) with Voice over IP (VOIP) capabilities that are reachable via a telephone call and the like.

Figure 2:
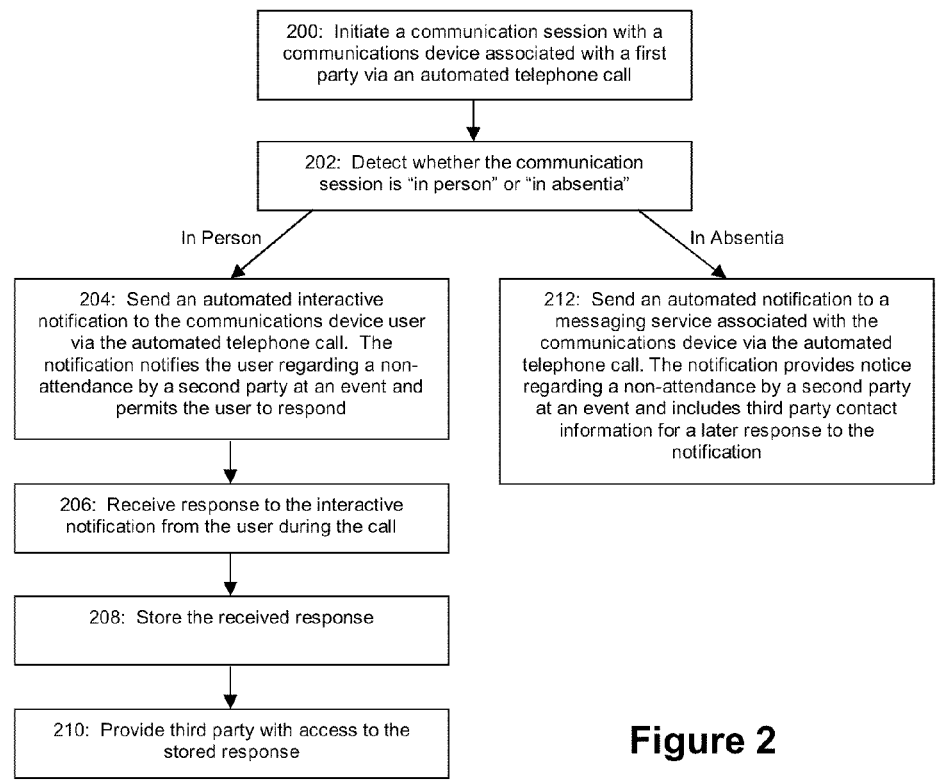
FIG. 2 depicts a flowchart showing an exemplary process flow for an automated notification system.

FIG. 2 depicts an exemplary process flow that can carried out by processor 102 in an exemplary embodiment. This process flow can be performed by computer software that comprises a plurality of instructions resident on a computer-readable storage medium (such as memory 104) and executable by processor 102 to carry out the described tasks.

At step 200, the processor 102 initiates a communication session with a communications device 108 associated with a first party via an automated telephone call. In a preferred embodiment, this step comprises placing an automated telephone call to a telephone number associated with the first party. Any suitable voice broadcast software with capabilities for automatically placing telephone calls could be employed for this step. As noted above, in a preferred embodiment, the automated notification system provides notifications regarding student absences at school sessions to guardians of the absent students. In such a scenario, the first party is preferably a guardian for such an absent student.

Then, at step 202, the processor 102 detects whether the communication session is "in person" or "in absentia". An "in person" communication session indicates that a user of the communications device is actually participating in the communication session. For example, when the communication session is a telephone connection, this would mean a person has answered the telephone call. An "in absentia" communication session means that a user of the communications device is not actually participating in the communication session. Returning to the telephone call example, this would mean that voice mail or the like has answered the telephone call. To perform this detection, the processor 102 can perform voice analysis detection as known in the art. For example, known voice analysis algorithms can be employed to detect whether the call recipient's voice energy is within a frequency range associated with a live human or a frequency range associated with a prerecorded voice such as the greetings used with voice mail. The automated notification system 100 intelligently handles the notifications it provides based on the result of step 202.

If step 202 detects an "in person" communication session, then, at step 204, the processor 102 sends an automated interactive notification through network 106 and communications device 108 to the user of the communications device via the automated telephone call. It should be understood that this user is not necessarily the same person as the first party because the first party may have shared his/her communications device with another person and that person may be the one who answers to the call. This automated notification is configured to provide a notification regarding a non-attendance by a second party at an event. Preferably, this notification is an audio notification provided by an audio file. Further, in the preferred embodiment where the notification concerns a school absence by a student, this second party is the student and the event is a school session (which may be either an entire school day or part of a school day (e.g., one or more classes).

Figure 6A:
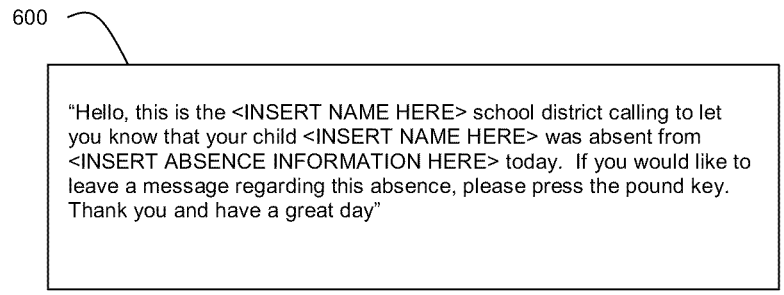
FIG. 6(a) depicts an exemplary automated notification that can be used by the automated notification system when the system detects an "in person" answer from a call.

The automated notification provided during the "in person" communication session is also interactive to permit the user of the communication device to leave a recorded message during the communication session for storage by the system 100 for later access by a third party. Returning to the school absence scenario, this third party may be an employee of a school, such as an administrative person who handles attendance issues for the school. An example of such an automated interactive notification is depicted in FIG. 6(a). FIG. 6(a) shows audio data 600 for an automated interactive notification where a pre-recorded message states:

"Hello, this is the <INSERT NAME HERE> school district calling to let you know that your child <INSERT NAME HERE> was absent from <INSERT ABSENCE INFORMATION HERE> today. If you would like to leave a message regarding this absence, please press the pound key. Thank you and have a great day."

It should be understood that any of a number of alternative phrasings could be used to achieve the automated notification, and FIG. 6(a) is merely an example.

As shown in the example of FIG. 6(a), the automated interactive notification of step 204 is also preferably personalized to the guardian. For example, the notification states the name of the particular student who was absent. The notification may also state the nature of the particular student's absence if such data is available (for example, stating that the student missed third period or was absent for the morning attendance, etc.). Other personalizations can also be implemented if desired. For example, the notification can include the name of the guardian to whom the notification is directed. To achieve such personalization, the processor can employ various Interactive Voice Response (IVR) building tools that permit users to create audio notifications from scripts, save those notifications as audio files and associate the notification audio files with various flow events that may occur during an automated telephone call. For example, each school or school district may have an associated set of automated notifications that are to be played by the system during the automated telephone calls. Personalization data such as student names can be added to each notification based on the telephone number that is to receive the telephone call (e.g., inserting "John Doe" into the audio notification when the telephone number for John Doe's guardian is to be used).

After being prompted to leave a message, the user can then state an explanation for the absence (e.g., "Johnny was sick today") or leave some other type of response. At step 206, the processor receives this response from the user, and at step 208 the processor stores the response in memory 104. For example, the response can be saved as an audio file (e.g., a .wav file) in memory.

Next, at step 210, the processor provides the third party with access to the stored response. This can be accomplished in any of a number of ways. For example, the processor can send an email that includes a file containing the stored response to an email address associated with the third party. As another example, rather than including the audio response file in the email, the email can include a link that is selectable by the third party to remotely playback the stored audio response file. As yet another example, the processor can make the audio response file accessible from a website, and the third party can access the website to playback the response.

Thus, steps 200-210 can operate to provide automated interactive notifications to guardians regarding student absences that permit the guardians to immediately respond to those notifications while avoiding the problem of inundating school personnel with calls from guardians regarding those absences. Rather than school personnel being flooded with calls from guardians soon after the initial broadcasts of notifications go out, school personnel will be able to asynchronously access stored responses about the notifications as their work schedules permit, thus providing school personnel with the freedom to perform other work tasks if desired during the time after the notification broadcasts go out.

If step 202 detects an "in absentia" communication session, then, at step 212, the processor 102 sends an automated interactive notification through network 106 to a messaging service associated with the communications device (typically this messaging service would be the voice mail associated with the communications device). This automated notification is configured to provide the notification regarding the non-attendance by the second party at the event. Preferably, this notification is an audio notification provided by an audio file. Further, in the preferred embodiment where the notification concerns a school absence by a student, this second party is the student and the event is a school session (which may be either an entire school day or part of a school day (e.g., one or more classes).

The automated notification provided during the "in absentia" communication session is configured to include contact information associated a third party. This way, when the first party later receives the notification (e.g., when he/she picks up his/her voice mail), he can use that contact information to respond to the notification. Preferably, this contact information is a telephone number for an answering service (e.g., a 1-800 number that connects a caller to an automated call processing voice mail system). Returning to the school absence scenario, this third party may be an employee of a school, such as an administrative person who handles attendance issues for the school. A practitioner can maintain a telephone number that is associated with the school for receiving calls in response to the notifications.

Figure 6B:
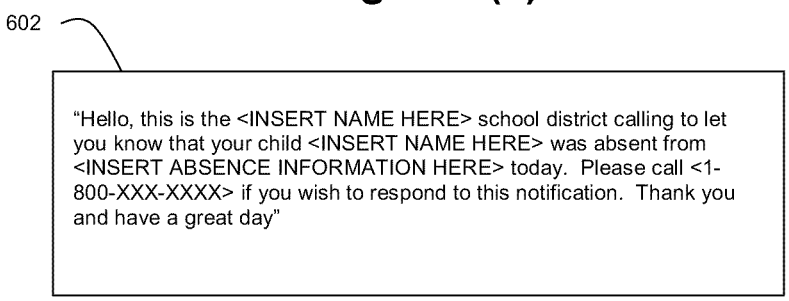
FIG. 6(b) depicts an exemplary automated notification that can be used by the automated notification system when the system detects an "in absentia" answer from a call.
Figure 6C:
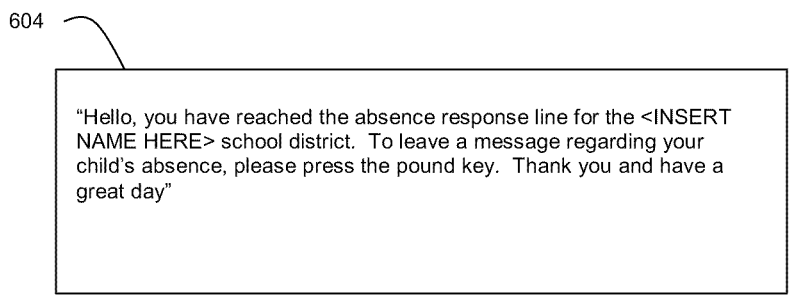
FIG. 6(c) depicts an exemplary automated message that can be played to a caller as part of the process flow shown in FIG. 3.

An example of an automated interactive notification for "in absentia" communications at step 212 is depicted in FIG. 6(*b*). FIG. 6(*b*) shows audio data 602 for an automated interactive notification where a pre-recorded message states:

"Hello, this is the <INSERT NAME HERE> school district calling to let you know that your child <INSERT NAME HERE> was absent from <INSERT ABSENCE INFORMATION HERE> today. Please call <1-800-XXX-XXXX> if you wish to respond to this notification. Thank you and have a great day."

As with the example of FIG. 6(*a*), the automated notification at step 212 is also preferably personalized to the guardian, as shown in connection with FIG. 6(*b*).

It should be understood that the contact information for the third party included in the notification of step 212 could be contact information for live communications with the third party. However, it is preferred that this contact information be for indirect communications with the third party through a messaging service so as to free the third party from intermittent contacts with first parties throughout the day to receive their responses. By receiving these responses indirectly via a messaging service, the third party is freed to gain access to the first party responses when appropriate for the third party's work schedule.

FIG. 3 depicts an exemplary process flow that can carried out by processor 102 in an exemplary embodiment when handling responses to the automated notification of step 212. This process flow can be performed by computer software that comprises a plurality of instructions resident on a computer-readable medium (such as memory 104) and executable by processor 102 to carry out the described tasks. In this exemplary embodiment, it will be assumed that the third party contact information is a telephone number associated with the third party. With the process flow of FIG. 3, the notification system 100 acts as a messaging service for a third party, as described below.

At step 300, the processor receives a telephone call from a caller at the telephone number associated with the third party. The caller is likely one of the first parties who received the automated notification as a result of step 212. However, this will not necessarily be the case.

At step 302, the processor plays an automated message for the caller. This automated message will prompt the caller to leave a response regarding the student's absence. Preferably, this automated response is personalized to the caller by identifying the school at which it is believed the caller has a student. However, this need not be the case. FIG. 6(*c*) shows audio data 604 for an automated message for step 302 where a pre-recorded message states:

"Hello, you have reached the absence response line for the <INSERT NAME HERE> school district. To leave a message regarding your child's absence, please press the pound key. Thank you and have a great day."

It should be understood that any of a number of alternative phrasings could be used for this automated message, and FIG. 6(*c*) is merely an example. Furthermore, as noted above, any of a variety of techniques can be used to construct and store such a message, such as through the use of IVR building tools as previously discussed.

After being prompted to leave a response, the caller can then state an explanation for the absence (e.g., "Sally was in Chicago visit her grandmother") or leave some other type of response. At step 304, the processor receives this response from the caller, and at step 206 the processor stores the response in memory 104. For example, the response can be saved as an audio file in memory, as described above in connection with step 208.

Next, at step 308, the processor provides the third party with access to the stored response. This step can be performed as described above in connection with step 210.

FIGS. 4(*a*) and (*b*) depict exemplary data structures that can facilitate how the processor 102 performs the process flows of FIGS. 2 and 3. While the examples of FIG. 4(*a*) and (*b*) depict generally tabular data structures, it should be understood that any data structure that associates the pertinent data fields to enable the processor to carry out its tasks could be used. For example, these data structures could be XML files that include metadata tags to identify the nature of the different data fields. Furthermore, these data structures could be in a flat text file or comma separated value (CSV) file format.

FIG. 4(*a*) depicts an exemplary data structure 400 that includes a list of students who were absent from a school session for a particular day (or range of days). For example, the data structure may include a guardian contact information field that identifies the telephone number on file for each guardian of an absent student. The data structure also preferably associates each item of guardian contact information in the data structure with a particular absent student. By doing so, the system 100 can personalize the automated notifications by identifying the name of the absent student in the notifications. The data structure may also associate each item of guardian contact information in the data structure with the name(s) for the guardian(s) of the absent student. Such data can be used by the system 100 to further personalize the notifications if desired. Further still, the data structure may also associate each item of guardian contact information in the data structure with the identification information for a school and/or school district. Such data can be used not only for personalization but also to determine the third party contact information that gets included in the "in absentia" notifications. To further personalize the notification to the type of absence, the data structure 400 may further associate each item of guardian contact information with a data field that corresponds to a particular type of absence for that guardian's student, presuming the school district maintains this information in some fashion (see the "Absence ID" field in FIG. 4(a)). For example, the data in this field may identify that the absence was for an entire day or for a particular class/period. While the data structure 400 of FIG. 4(a) shows these data fields, it should be understood that more, fewer, and/or different data fields could be employed.

Figure 5:
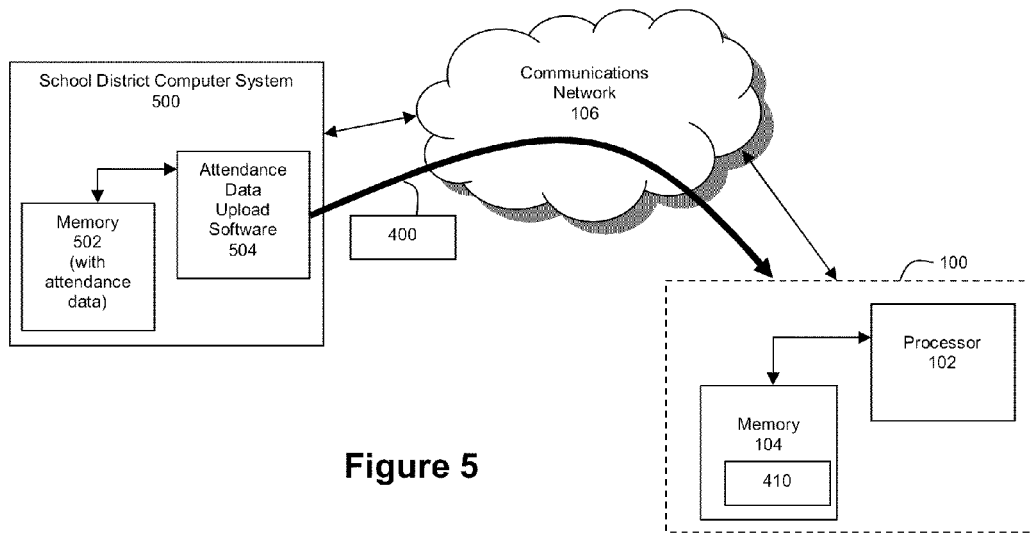
FIG. 5 depicts an exemplary system diagram illustrating how a school district computer system can communicate attendance data to an automated notification system.

The data structure 400 can be created in any of a number of ways. In a preferred embodiment exemplified by FIG. 5, the data structure 400 is automatically generated by attendance data upload software 504 that is resident on a school district computer system 500. The school district computer system may comprise a network of workstation and server computers, as would be understood by a person having ordinary skill in the art. The software program 504 should be resident on an appropriate computer where it will have access to the school's attendance data. This software 504 acts as an upload agent that automatically pulls attendance data out of memory 502 and uploads that attendance data to the system 100. The software agent 504 can be triggered on a scheduled basis or event-driven basis. For example, the software agent can be configured to "wake up" each day at a particular time (for example, around 10 am after a school has completed data entry for attendance data into its computer system), extract attendance data and guardian contact information (or any other relevant data that is needed) from memory 502 and upload that data to system 100. The software agent can be configured to perform the extraction by accessing particular files in the computer systems file system or applying certain queries to the database of the computer system as appropriate.

Also, the upload agent need not be limited to once a day uploads. For example, it could run once in the morning and again after the end of the school day. Further still, the upload agent can be triggered in response to events, such as by integrating the agent with a software program used by a school to maintain attendance data, whereby a school employee would select an "attendance entry completed" button or the like after completing data entry for attendance that would trigger the upload agent to run.

After the software agent 504 completes its extraction and creates data structure 400, the agent can then send the data structure to the automated notification system 100 over a communications network 106 such as the Internet. The software agent 504 can send the data structure 400 as a web service transmission to the system 100, where the data structure is enclosed in a Simple Object Access Protocol (SOAP) wrapper. For example, the software agent 504 can enclose a flat or CSV file of attendance data corresponding to data structure 400 in a SOAP wrapper for transmission over the network 106 to system 100. Upon receipt, the processor 102 can then store the data structure 400 as a plurality of records in a database The processor 102 can then use the data in this structure 400 to create appropriate automated notifications and determine who will receive automated notifications.

An example of software that can be used as this upload agent is the EZ DATA SYNC software available from GroupCast Messaging Systems, LLC of St. Louis, Mo.

It should be understood that that upload agent 504 could be configured to extract only a list of absentee students from a schools computer system. In such a scenario, a mirror of the school's records regarding the associations between students, guardians, and guardian contact information could be maintained by the system 100. Then upon receipt of a data structure that is simply a list of absent students, the processor 102 can be configured process this list against the mirror students-to-guardians record to create the data structure 400.

As an alternative to an automated upload agent, the system can gain access to attendance data by having the school manually transmit the attendance data to the system (for example, emailing a file with an absentee list). It should be understood that any of a number of other techniques could be used by the system 100 to learn which guardians need to be contacted regarding student absences.

Figure 4B:
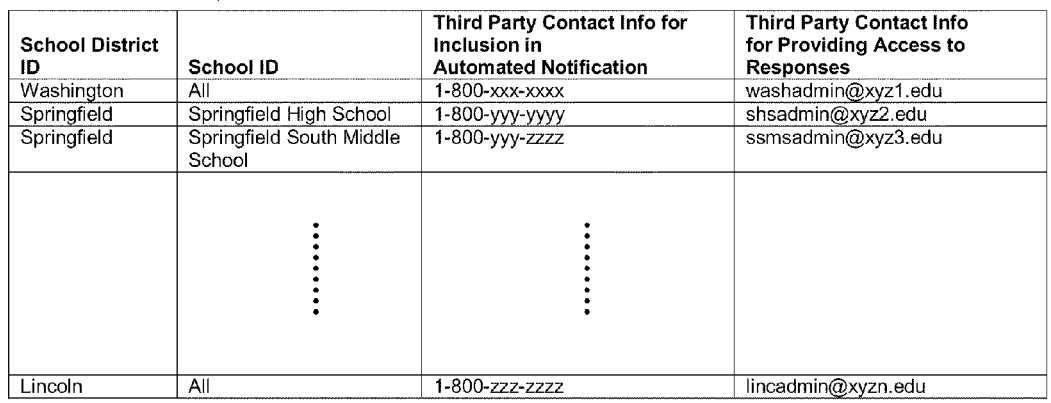
FIGS. 4(a) and (b) depict exemplary data structures that can be employed by an automated notification system to carry out the process flows of FIGS. 2 and 3.

FIG. 4(b) depicts an exemplary data structure 410 for use by the processor 102 to build the automated notifications used at step 212 and how to identify the third parties who get access to stored responses at steps 210 and 308. Each school and/or school district is associated with contact information for inclusion in the automated notifications of step 212. In an exemplary embodiment, this contact information is a telephone number (such as a 1-800 number or the like). Each school and/or school district is also preferably associated with third party contact information for gaining access to the responses stored by the system 100 at steps 208 and 306. In an exemplary embodiment, this contact information can be the email addresses of the school personnel who maintain and review attendance records.

Figure 8:
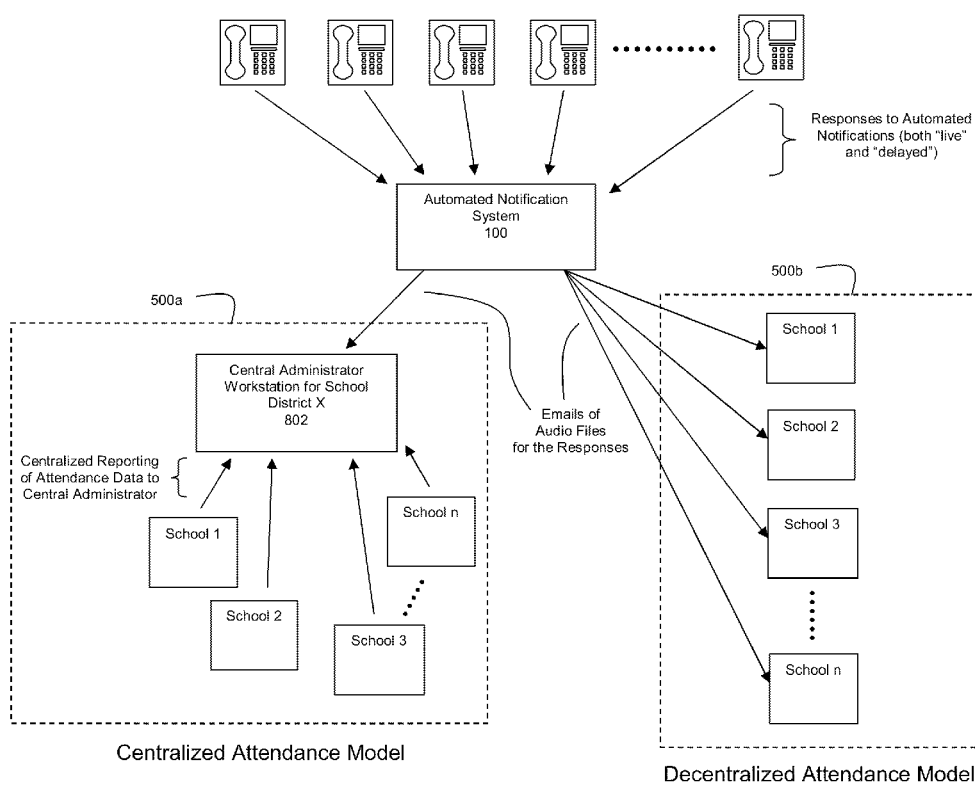
FIG. 8 illustrates exemplary centralized and decentralized modes for reporting attendance data and receiving notification responses.

To differentiate between calls at step 300 by parents of students in different schools and/or school districts, the system 100 preferably maintains separate contact information for each school and/or school district that subscribes to the notification service. For example, in a school district that maintains a centralized attendance system, the data structure 410 may associate all schools in that district with a single telephone number and/or a single email address (see the "Washington" and "Lincoln" school districts in the exemplary data structure 410 of FIG. 4(b)). With reference to FIG. 8, this mode of operation is reflected by school district computer system 500a. The different schools in this district may report their attendance data to a central administrator for the entire district who handles attendance issues. As responses are received by the central administrator at steps 210 and 308, the administrator can then disseminate the responses to schools as desired.

Some schools may employ more decentralized attendance records. In such an instance, the data structure 410 can be configured to maintain a different telephone number for inclusion in the automated notifications of step 212 and/or different email address for each school (see the "Springfield" school district in the exemplary data structure 410 of FIG. 4(b)). With reference to FIG. 8, this mode of operation is reflected by school district computer system 500b. The different schools in this district may also directly report their attendance data to the system 100 without going through a central school administrator.

Figure 7:
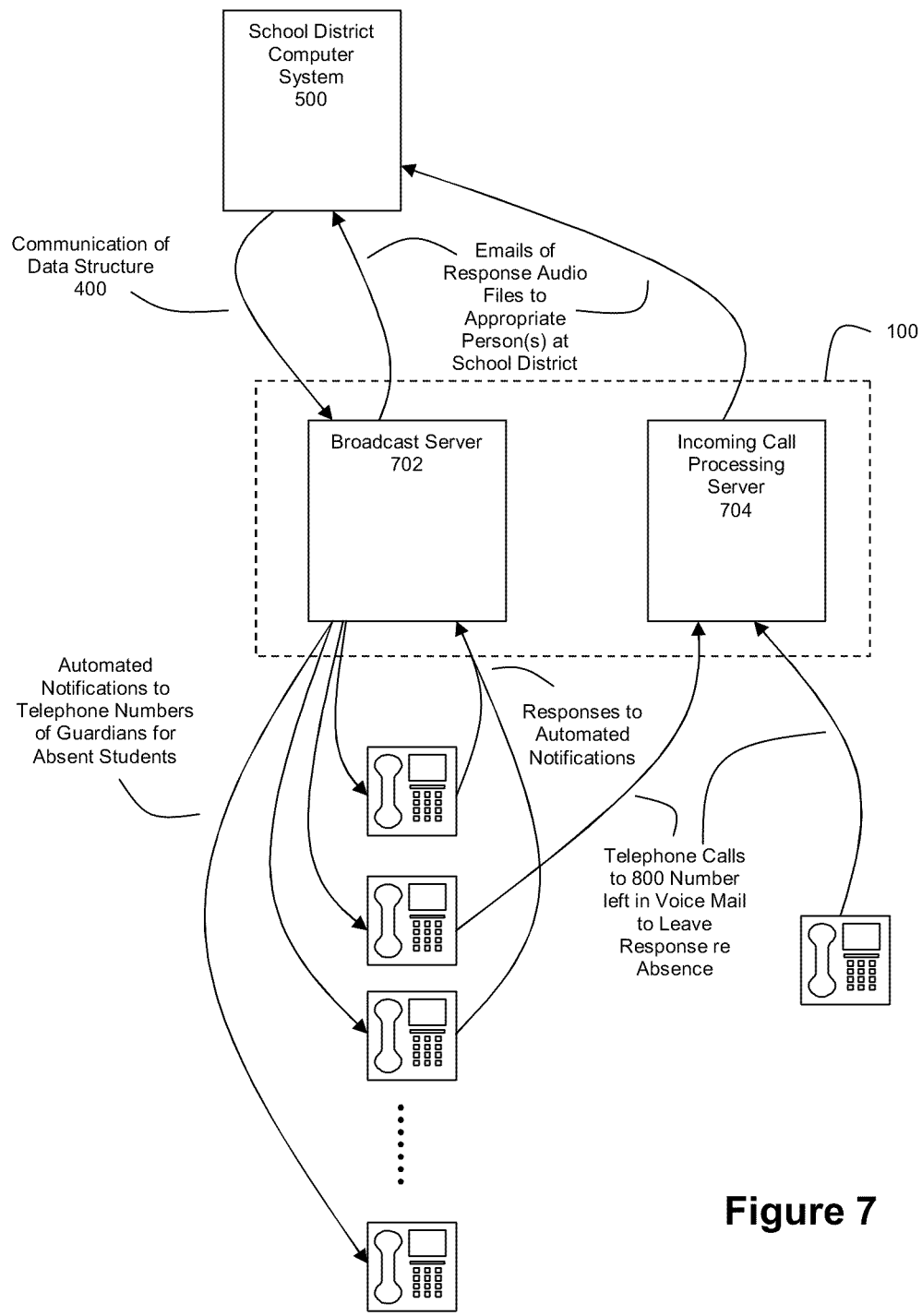
FIG. 7 is an exemplary system and process flow diagram for an exemplary embodiment of an automated notification system.

As noted above, the processor 102 may comprise a plurality of different processors. FIG. 7 depicts an embodiment where the processor 102 comprises the processors of a plurality of servers. For example, the system 100 may comprise one or more broadcast servers 702 and one or more incoming call processing servers 704. The broadcast servers 702 can be configured to perform the outbound automated notifications and other steps 200-212 shown in FIG. 2 while the incoming call processing servers 704 can be configured to perform the steps 300-308 shown in FIG. 3. Thus, in accordance with an exemplary embodiment, the system 100 can be employed as follows:

1. The school district computer system 500 stores attendance data in response to input from school district personnel
2. The school district computer system 500 communicates a data structure 400 corresponding to the attendance data to the automated notification system for use by the broadcast server(s) 702 to determine the automated calls that need to placed to send out the automated notifications regarding student absences.
3. The broadcast server(s) 702 automatically send automated notifications to the telephone numbers for the guardians of absent students.
4. The broadcast server(s) 702 receive responses to the automated notifications that are received in person by the guardians (or representatives of the guardians).
5. The responses to the in person notifications are converted to audio files and emailed by the broadcast server(s) 702 to a third party contact at the school district.
6. For automated notifications that were made "in absentia" to the voice mails of guardians, the incoming call processing server(s) 704 will receive calls from guardians placed to the telephone number included in the automated notification.
7. The incoming call processing server(s) 704 will play an automated message to the callers to prompt them to leave a message regarding student absences.
8. The responses to the automated messages are converted to audio files and emailed by the incoming call processing server(s) 704 to a third party contact at the school district.

Thus, the exemplary embodiment of FIG. 7 is able to (1) provide automated notifications to guardians regarding student absences from school, (2) receive responses from those guardians in an automated fashion, and (3) communicate those received response to interested personnel in schools, all with minimal involvement of school district personnel, thereby freeing school district personnel to perform other tasks.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should further be understood that the embodiments disclosed herein include any and all combinations of features as disclosed herein and/or described in any of the dependent claims.

What is claimed is:

1. A method comprising:
    initiating a communication session with a communications device associated with a first party via an automated telephone call;
    detecting whether the communication session is an in person communication with a user of the communications device or an in absentia communication session with the communications device;
    in response to detecting that the communication session is the in person communication session, (1) sending a first automated notification to the user via the automated telephone call, the first automated notification configured to provide a notification regarding a non-attendance by a second party at an event, wherein the first automated notification is further configured to prompt the user for an explanation regarding the non-attendance and be interactive to permit the user to respond to the notification with the explanation during the automated telephone call, (2) receiving a response from the user to the first automated notification during the automated telephone call, (3) storing the received response, and (4) providing a third party with access to the stored response; and
    in response to detecting that the communication session is the in absentia communication session, sending a second automated notification to a messaging service associated with the communications device via the automated telephone call, the second automated notification configured to provide a notification regarding the non-attendance by the second party at the event and also including contact information associated with the third party; and
    wherein the initiating, detecting, first automated notification sending, receiving, storing, providing and second automated notification sending steps are performed by a processor; and
    wherein the second party comprises a student at a school, wherein the first party comprises a guardian for the student, wherein the communications device comprises a telephone having a telephone number that is associated with the guardian, wherein the event comprises a school session, and the method further comprising the processor personalizing the first and second automated notifications to the guardian regarding non-attendance by the student at the school session.

2. The method of claim 1 wherein initiating step comprises placing the automated telephone call to the telephone number associated with the guardian, wherein the first and second automated notifications comprise an audio notification during the automated telephone call, and wherein the detecting step comprises detecting whether the automated telephone call was received in person by the user or whether the automated telephone call was received in absentia via voice mail.

3. The method of claim 2 further comprising:
    automatically generating a data structure from data in a school computer system that represents a list of absentee students; and
    automatically processing the data structure to identify telephone numbers for a plurality of guardians for the absentee students; and
    performing the steps of claims 1-2 for each of the plurality of guardians including personalizing the first and second automated notifications based on the automatically processed data structure.

4. The method of claim 3 further comprising the processor receiving the data structure over a communications network from the school computer system.

5. The method of claim 4 wherein the data structure receiving step comprises receiving the data structure over the communications network as a web service communication from the school computer system.

6. The method of claim 3 wherein the step of automatically generating the data structure comprises including the telephone numbers for the plurality of guardians associated with the absentee students on the list in the data structure.

7. The method of claim 6 wherein the step of automatically generating the data structure further comprises including contact information for at least one third party associated with the absentee students on the list in the data structure, and wherein the step of automatically processing the data structure further comprises automatically processing the data structure to identify contact information for at least one third party to include in the second automated notification, the method further comprising the processor inserting the identified contact information for the at least one third party into the second automated notification for each guardian's identified telephone number.

8. The method of claim 2 further comprising:
automatically generating a data structure from data in a school computer system that identifies telephone numbers for a plurality of guardians for a plurality of absentee students; and
automatically processing the data structure to identify the telephone numbers for the plurality of guardians for the absentee students for use during the initiating step; and
performing the steps of claims 1-2 for each of the plurality of guardians including personalizing the first and second automated notifications based on the automatically processed data structure.

9. The method of claim 2 wherein the storing step comprises storing the received response as an audio file and wherein the providing step comprises automatically sending the audio file to an email address associated with the third party.

10. The method of claim 9 wherein the third party comprises a school employee, and wherein the third party contact information comprises a telephone number associated with the third party.

11. The method of claim 10 further comprising the following steps performed by a processor:
receiving a telephone call from a caller at the telephone number associated with the third party;
playing an automated message to the caller during the telephone call, wherein the automated message is configured to prompt the caller for an explanation regarding the non-attendance;
receiving a response to the automated message from the caller;
storing the received response to the automated message; and
providing the third party with access to the stored response to the automated message.

12. The method of claim 11 wherein the step of providing the third party with access to the stored response to the automated message comprises automatically sending the stored response to an email address associated with the third party.

13. The method of claim 12 further comprising the following steps performed by a processor:
maintaining a data structure that associates a plurality of different schools within a school district with a plurality of the third party telephone numbers; and
processing the data structure to determine which third party telephone numbers to include in a plurality of the automated notifications to be sent during in absentia communication sessions.

14. The method of claim 13 wherein the data structure further associates the schools with different email addresses for personnel associated with the schools, the processor further processing the data structure to determine the email addresses to which the stored responses are to be sent.

15. The method of claim 12 further comprising the following steps performed by a processor:
maintaining a data structure that associates a school district with a third party telephone number such that a plurality of different schools within the school district are associated with the same third party telephone number; and
processing the data structure to determine the third party telephone number to include in a plurality of the automated notifications to be sent during in absentia communication sessions.

16. The method of claim 15 wherein the data structure further associates the school district with an email address for a person associated with the school district such that the different schools within the school district are associated with the same email address, the processor further processing the data structure to determine the email address to which the stored responses are to be sent.

17. A system comprising:
a processor configured to (1) initiate a communication session with a communications device associated with a first party via an automated telephone call, (2) detect whether the communication session is an in person communication with a user of the communications device or an in absentia communication session with the communications device, (3) in response to detecting that the communication session is the in person communication session, (a) send a first automated notification to the user via the automated telephone call, the first automated notification configured to provide a notification regarding a non-attendance by a second party at an event, wherein the first automated notification is further configured to prompt the user for an explanation regarding the non-attendance and be interactive to permit the user to respond to the notification with the explanation during the automated telephone call, (b) receive a response from the user to the first automated notification during the automated telephone call, (c) store the received response, and (d) provide a third party with access to the stored response, and (4) in response to detecting that the communication session is the in absentia communication session, send a second automated notification to a messaging service associated with the communications device via the automated telephone call, the second automated notification configured to provide a notification regarding the non-attendance by the second party at the event and also including contact information associated with the third party, wherein the second party comprises a student at a school, wherein the first party comprises a guardian for the student, wherein the communications device comprises a telephone having a telephone number that is associated with the guardian, and wherein the event comprises a school session; and
wherein the processor is further configured to personalize the first and second automated notifications to the guardian regarding non-attendance by the student at the school session.

18. The system of claim 17 wherein the processor is further configured to (1) initiate the communication session by placing the automated telephone call to the telephone number associated with the guardian, wherein the first and second automated notifications comprise an audio notification during the automated telephone call, and (2) perform the detection operation by detecting whether the automated telephone call was received in person by the user or whether the automated telephone call was received in absentia via voice mail.

19. The system of claim 18 wherein the processor is further configured to (1) receive a data structure over a communications network from a school computer system, wherein the data structure represents a list of absentee students, (2) automatically process the data structure to identify telephone numbers for a plurality of guardians for the absentee students, and (3) perform the operations recited by claims 17-18 for each of the plurality of guardians including personalize the first and second automated notifications based on the automatically processed data structure.

20. The system of claim 19 wherein the processor is further configured to receive the data structure over the communications network as a web service communication from the school computer system.

21. The system of claim 19 wherein the data structure comprises the telephone numbers for the plurality of guardians associated with the absentee students on the list.

22. The system of claim 21 wherein the data structure further comprises contact information for at least one third party associated with the absentee students on the list, and wherein the processor is further configured to automatically process the data structure to identify contact information for at least one third party to include in the second automated notification, and wherein the processor is further configured to insert the identified contact information for the at least one third party into the second automated notification for each guardian's identified telephone number.

23. The system of claim 18 wherein the processor is further configured to (1) receive a data structure over a communications network from a school computer system, wherein the data structure identifies the telephone numbers for the plurality of guardians for the plurality of absentee students, (2) automatically process the data structure to identify the guardians' telephone numbers, and (3) perform the operations recited by claims 17-18 for each of the plurality of guardians including personalize the first and second automated notifications based on the automatically processed data structure.

24. The system of claim 18 wherein the processor is further configured to (1) store the received response as an audio file, and (2) provide the third party with access to the stored response by sending the audio file to an email address associated with the third party.

25. The system of claim 24 wherein the third party comprises a school employee, and wherein the third party contact information comprises a telephone number associated with the third party.

26. The system of claim 25 wherein the processor is further configured to (1) receive a telephone call from a caller at the telephone number associated with the third party, (2) play an automated message to the caller during the telephone call, wherein the automated message is configured to prompt the caller for an explanation regarding the non-attendance, (3) receive a response to the automated message from the caller, (4) store the received response to the automated message, and (5) provide the third party with access to the stored response to the automated message.

27. The system of claim 26 wherein the processor is further configured to provide the third party with access to the stored response to the automated message by automatically sending the stored response to the automated message to an email address associated with the third party.

28. The system of claim 27 wherein the processor is further configured to (1) maintain a data structure that associates a plurality of different schools within a school district with a plurality of the third party telephone numbers, and (2) process the data structure to determine which third party telephone numbers to include in a plurality of the automated notifications to be sent during in absentia communication sessions.

29. The system of claim 28 wherein the data structure further associates the schools with different email addresses for personnel associated with the schools, the processor further configured to process the data structure to determine the email addresses to which the stored responses are to be sent.

30. The system of claim 27 wherein the processor is further configured to (1) maintain a data structure that associates a school district with a third party telephone number such that a plurality of different schools within the school district are associated with the same third party telephone number, and (2) process the data structure to determine the third party telephone number to include in a plurality of the automated notifications to be sent during in absentia communication sessions.

31. The system of claim 30 wherein the data structure further associates the school district with an email address for a person associated with the school district such that the different schools within the school district are associated with the same email address, the processor further configured to process the data structure to determine the email address to which the stored responses are to be sent.

32. The system of claim 26 wherein the processor comprises a first processor and a second processor, the first processor configured to perform the operations recited by claims 1-2, the second processor configured to perform the operations recited by claim 10.

33. The system of claim 32 wherein the first processor comprises at least one server configured for communication with a communications network, and wherein the second processor comprises at least one other server configured for communication with a communications network.

34. The system of claim 17 wherein the processor comprises a server configured for communication with a communications network.

35. The system of claim 20 further comprising:
an upload agent resident within the school computer system, the processor in communication with the school computer system over a network, the upload agent configured to automatically (1) extract attendance data from the school computer system, (2) generate the data structure based on the extracted attendance data, and (3) communicate the data structure to the processor over the network.

36. The system of claim 35 wherein the upload agent is further configured to automatically perform its operations on a scheduled basis.

37. The system of claim 35 wherein the upload agent is further configured to automatically perform its operations on an event-driven basis.

* * * * *